US007507026B2

(12) United States Patent
Andrews et al.

(10) Patent No.: US 7,507,026 B2
(45) Date of Patent: Mar. 24, 2009

(54) SYSTEMS, METHODS AND DEVICES FOR X-RAY DEVICE FOCAL SPOT CONTROL

(75) Inventors: Gregory C. Andrews, Draper, UT (US); Ricky Smith, Sandy, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 11/876,656

(22) Filed: Oct. 22, 2007

(65) Prior Publication Data

US 2008/0037713 A1 Feb. 14, 2008

Related U.S. Application Data

(62) Division of application No. 10/833,696, filed on Apr. 28, 2004, now Pat. No. 7,286,644.

(51) Int. Cl.
*G01N 23/223* (2006.01)

(52) U.S. Cl. ....................................... 378/197; 378/207

(58) Field of Classification Search ................. 378/125, 378/127, 128, 138, 119, 196, 197, 207
See application file for complete search history.

(56) References Cited

U.S. PATENT DOCUMENTS 5,751,788 A 5/1998 Khutoryansky et al.
5,867,556 A 2/1999 Snyder et al.
7,072,439 B2 7/2006 Radley et al.
7,382,856 B2 * 6/2008 Radley et al. ................. 378/47
2002/0015470 A1 * 2/2002 Tybinkowski et al. ......... 378/17
2005/0053197 A1 3/2005 Radley et al.

OTHER PUBLICATIONS

U.S. Appl. No. 10/833,696, filed Feb. 3, 2006, Non-Final Rejection.
U.S. Appl. No. 10/833,696, filed Nov. 29, 2006, Non-Final Rejection.
U.S. Appl. No. 10/833,696, filed Jun. 18, 2007, Notice of Allowance.

* cited by examiner

*Primary Examiner*—Hoon Song
(74) *Attorney, Agent, or Firm*—Workman Nydegger

(57) ABSTRACT

Systems, methods and devices for implementing automatic control of focal spot Z axis positioning are disclosed for use with an x-ray device having an x-ray tube positioned within a housing and configured for thermal communication with a temperature control system. Control circuitry, and a position sensing device configured to determine the distance between the focal spot and a reference point related to the x-ray device, are coupled with a control module. The position sensing device sends information concerning the relative distance between the focal spot and the reference point to the control module which compares the received information with a predetermined desired distance. If the received information varies by an unacceptably large margin from the desired distance, the control module sends a corresponding signal to the control circuitry which causes the temperature control system to implement an appropriate change to a heat transfer parameter associated with the x-ray device.

17 Claims, 12 Drawing Sheets

SYSTEMS, METHODS AND DEVICES FOR X-RAY DEVICE FOCAL SPOT CONTROL

CROSS-REFERENCE TO RELATED TO APPLICATIONS

This application is a division, and claims the benefit, of U.S. patent application Ser. No. 10/833,696, filed Apr. 28, 2004 entitled SYSTEMS, METHODS AND DEVICES FOR X-RAY FOCAL SPOT CONTROL, which is incorporated herein in its entirety.

BACKGROUND OF THE INVENTION

1. The Field of the Invention

The present invention relates generally to x-ray systems, devices, and related components. More particularly, exemplary embodiments of the invention concern systems, methods and devices for implementing automatic control of Z axis focal spot location.

2. The Relevant Technology

The ability to consistently develop high quality radiographic images is an important element in the usefulness and effectiveness of x-ray devices as diagnostic tools. However, various factors relating to the construction and/or operation of the x-ray device often serve to materially compromise the quality of radiographic images generated by the device. Such factors include, among others, vibration caused by moving parts of the x-ray device, and various thermally induced effects such as the occurrence of physical changes in the x-ray device components as a result of high operating temperatures and/or thermal gradients.

The physical changes that occur in the x-ray device components as a result of the relatively high operating temperatures typically experienced by the x-ray device are of particular concern. Not only do the high operating temperatures impose significant mechanical stress and strain on the x-ray device components, but the heat transfer effected as a result of those operating temperatures can cause the components to deform, either plastically or elastically.

While plastic deformation of an x-ray device component is a concern because it may be symptomatic of an impending failure of the component, elastic deformation of the x-ray device components under high heat conditions is problematic as well. For example, as the various components and mechanical joints are subjected to repeated elastic deformation under the influence of thermal cycles, the connections between the components can loosen and the components may become misaligned or separated.

In addition, the elastic deformation of x-ray device components has significant implications with respect to the performance of the x-ray device. One area of particular concern relates to the effects of the elastic deformation of x-ray device components on focal spot location and positioning. As discussed below, the quality of the radiographic images produced by the device depends largely on reliable and consistent positioning of the focal spot, any changes to the location and positioning of the focal spot during the generation of the radiographic image act to materially impair the quality of the image and, thus, the effectiveness of the x-ray device.

In general, the generation of a radiographic image involves the use of a cathode, or other electron emitter, to direct a beam of electrons at an anode, or target, having a target surface composed of a material such that, when the target surface is struck by the electrons, x-rays are produced. In order to produce a high quality image, the electrons of the electron beam are focused at a particular location, or focal spot, on the surface of the target.

As suggested above, problems occur when the location of the focal spot changes. The focal spot location can change in various ways. In some cases, the focal spot may shift within the imaginary X-Y plane that is generally perpendicular to the beam of electrons. So long as the focal spot remains at a desired Z axis position with respect to the detector however, such X-Y plane shifts may not be cause for particular concern. However, a shift in the Z axis location of the focal spot, as often occurs in connection with elastic deformation of x-ray device components such as the anode assembly and housing, is much more problematic.

With regard to the foregoing, the Z axis refers to an imaginary axis along which the emitted electrons travel from the cathode to the target surface of the anode. Thus, the Z axis is perpendicular to the X-Y plane. The focal spot is susceptible to movement along the Z axis as a result of relative changes in the positioning of the cathode with respect to the target surface of the anode. One of the most prevalent causes of such changes to the location of the focal spot is thermally induced elastic deformation of the anode assembly and/or x-ray device housing.

Typically, the anode assembly experiences a thermally induced deformation that causes the anode assembly to expand along the Z axis toward the cathode, thereby decreasing the distance between the cathode and the target surface, and effectively moving the focal spot from its intended position relative to the detector. However, elastic deformation of other x-ray device components may likewise cause Z axis focal spot motion. In any case, Z axis movement of the focal spot materially impairs the quality of the radiographic image.

A variety of attempts have been made to resolve the problem of thermally induced Z axis motion of the focal spot. As discussed below however, such attempts have proven ineffective and/or undesirable, for a variety of different reasons.

One general approach to the problem of Z axis focal spot motion concerns the use of electro-mechanical systems and devices to physically move the x-ray tube unit in order to compensate for thermally induced focal spot motion. In theory, the motion of the x-ray tube unit should offset any motion of the anode assembly, for example, so that the net change in the position of the focal spot is minimized. This particular approach has proven problematic in practice however.

For example, such electro-mechanical systems are typically quite complex and, accordingly, add significantly to the overall expense of the associated x-ray device. A related problem is that initial installation and testing of the system is often a lengthy and expensive process. Further, because these electro-mechanical systems introduce a variety of additional components and, thus, increase the number of potential failure points, such systems tend to reduce the overall reliability of the x-ray device. In a related vein, such electro-mechanical systems are typically maintenance intensive and must be frequently monitored in order to ensure proper functioning.

Yet another approach employed in an attempt to resolve the problem of Z axis focal spot motion involves the use of a software algorithm that gathers focal spot position data at various temperatures and uses the gathered information to determine an optimal distance between the cathode and anode assembly. More particularly, radiographic images are generated over temperatures ranging from a "cold" tube condition, or ambient temperature, to a "hot" tube condition, or anticipated steady state operating temperature. At each different temperature in the range, the location of the focal spot is determined. The gathered information can then be used to determine the focal distance at which the best radiographic image is produced. The cold positions of the cathode and/or anode assembly is/are then adjusted such that the ideal focal distance will be achieved at normal x-ray tube operating temperatures.

A significant disadvantage with this approach however, is that the x-ray device cannot be used "out of the box" to generate radiographic images. Rather, significant setup time and testing are required before the optimal focal spot location can be determined and image generation can begin. Such setup time and testing increase the overall expense associated with operation of the x-ray device.

Further, such an approach lacks a suitable feedback and/or compensation mechanism. In particular, the focal spot location data that is gathered concerning the x-ray tube is based on a like-new condition of the x-ray device and, accordingly, fails to provide any compensation for Z axis focal spot location changes that may occur during the break-in period of the device and/or focal spot location changes that typically occur as the x-ray device ages. Thus, a gradual, and sometimes undetected, degradation to the radiographic images can occur over time and, while the incremental change in the quality of the images may be subtle, such changes may seriously impair the diagnostic value of those images.

As the foregoing suggests, the x-ray device will require modification, at some point, to compensate for age related, and other, effects that have occurred since the x-ray device was initially placed into service. This modification is performed in the same fashion as at initial setup of the device and, depending upon the age and condition of the device, may be required to be performed several times over the life of the x-ray device, thereby increasing downtime as well as the overall cost of operating the device.

Finally, another approach to the problem of Z axis focal spot motion involves a passive compensation mechanism. More particularly, this approach involves attempting to compensate for anticipated Z axis focal spot motion by designing the x-ray device and associated components in such a way that the net thermally induced motion of the focal spot is minimized. This attempt to passively resolve the problem of Z axis focal spot motion has proven problematic in practice however.

For example, it is often difficult to design engineering models that can accurately predict the various thermally induced effects that will occur in the numerous components that make up the x-ray device. Moreover, the failure to account for all relevant variables and/or the failure to accurately model such variables seriously impairs the usefulness of the results obtained in connection with the engineering model. Thus, significant study, engineering analysis, and trial and error testing may be required before any useful conclusions can be drawn as to the nature of the structures that must be employed to minimize Z axis focal spot drift at operating temperatures.

Another problem with the aforementioned passive compensation approach is that even if a suitable engineering model is developed, the construction and assembly of the x-ray device structures required to ensure minimal focal spot drift can be quite expensive. As well, the physical and dimensional requirements of some x-ray devices are simply inconsistent with the use of the structures that the engineering model indicates are necessary for focal spot movement compensation.

Moreover, an x-ray device constructed in accordance with such engineering models will likely experience Z axis focal spot drift at some point during its lifespan. This is due in part to the fact that the model is typically based on the characteristics of a new x-ray device and does not include any mechanism to compensate for Z axis focal spot drift that results from physical changes that occur to the x-ray device as the device ages.

A further operational problem with the passive compensation approach relates to the response of the x-ray device when subjected to operating temperatures. In particular, the location of the focal spot tends to oscillate sinusoidally with respect to the reference point, or desired focal spot location, before the system stabilizes at the desired location.

Further, there may be some hysteresis reflected in the response of the x-ray device such that a time lag can occur between a change in operating temperature, and the corresponding shift in the focal spot location. In other cases, the hysteresis may be reflected by a failure of the x-ray device to fully reestablish the desired focal spot location after occurrence of a change in operating conditions. In any event, slow and/or incomplete responses to changes in operating conditions result in undesirable Z axis focal spot positioning.

In view of the foregoing, and other, problems in the art, it would be useful to provide relatively low cost systems, methods and devices that automatically control Z axis focal spot location in a wide variety of operating conditions.

BRIEF SUMMARY OF AN EXEMPLARY EMBODIMENT OF THE INVENTION

In general, embodiments of the invention are concerned with systems, methods and devices for implementing automatic control of focal spot Z axis positioning. In one exemplary embodiment of the invention, an x-ray device is provided that includes an x-ray tube positioned within a housing and configured for thermal communication with a liquid coolant circulated through the housing by way of a first fluid circuit of a dual fluid temperature control system. The dual fluid temperature control system includes a second fluid circuit that is in thermal communication with the first fluid circuit. In this exemplary embodiment, the second fluid circuit comprises one or more fans arranged to direct a flow of air over a portion of the first fluid circuit. Control circuitry associated with the dual fluid temperature control system, and a position sensing device configured to determine the distance between the anode assembly and a reference point are coupled with a control module.

In operation, the position sensing device sends information concerning the relative distance between the anode assembly and the reference point to the control module. The control module compares the received information with a predetermined distance that corresponds to a desired position of the focal spot relative to the detector and, if the received information varies by an unacceptably large margin from the predetermined distance, the control module sends a corresponding signal to the control circuitry which then causes an appropriate change to a heat transfer parameter associated with the dual fluid heat exchange system.

In this way, thermally induced changes to the Z axis position of the focal spot can be detected and appropriate action taken to automatically compensate for any such changes. More particularly, automatic modulation of a heat transfer parameter associated with the x-ray device enables accurate and reliable control of the Z axis position of the focal spot over a wide range of thermal conditions.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EXEMPLARY EMBODIMENTS OF THE INVENTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Generally, embodiments of the invention concern systems, methods and devices for controlling, such as through the use of open loop or closed loop feedback control systems, the Z axis location of a focal spot of an x-ray device, though the disclosure herein may be employed as well in connection with, for example, facilitating control of the axial positioning of a variety of other systems and devices. Because the Z axis location of the focal spot relative to the cathode is typically fixed, exemplary embodiments of the invention are concerned with positioning of the cathode and anode assembly, relative to each other, such that the Z axis location of the focal spot is on or near the target track of the anode assembly.

As discussed more particularly below, some implementations provide for control of the Z axis focal spot location by modulating one or more heat transfer parameters, such as the efficiency of a temperature control system for example, so that the temperature of various x-ray device components and, thus, the thermal expansion of such components is thereby controlled. Adjustment and/or control of the thermal expansion of the components, in turn, affords control of the relative positions of the cathode and the anode assembly and, thus, the location of the focal spot relative to a detector or detector array. Various inputs, examples of which include x-ray device input power and Z axis measurement information, can be used as inputs to the focal spot control system.

As well, calibration processes are disclosed that provide calculated and/or empirically determined data points which can be used in systems configured to implement control of the Z axis focal spot location. Information gathered in connection with calibration, and other, processes, is also used to inform the design and installation of mounting structures for the x-ray device.

I. Exemplary Operating Environments

Figure 1:
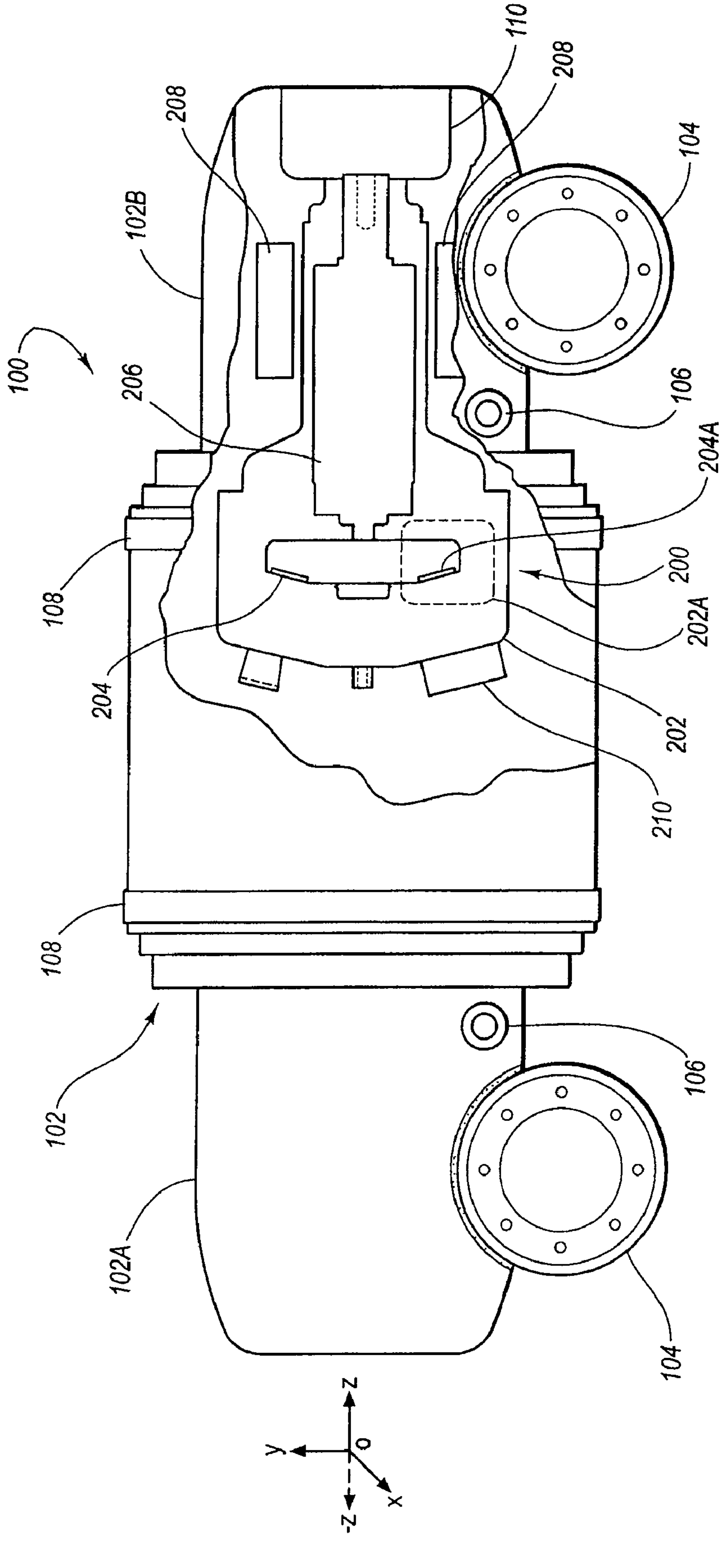
FIG. 1 is a partial cutaway view of an x-ray device showing the arrangement of the x-ray tube insert in the housing.

Directing attention now to FIG. 1, details are provided concerning an exemplary x-ray device 100. While various aspects of exemplary embodiments of the invention are discussed in the context of x-ray devices and related components, the scope of the invention is not so limited. Rather, some or all of the aspects of the disclosure hereof may be employed in connection with various other operating environments, and devices as well. Accordingly, the scope of the invention should not be construed to be limited solely to x-ray systems, devices, and components. For example, aspects of the disclosure are applicable to systems where the radiation source is stationary, relative to the subject, as well as to systems where the radiation source moves relative to the subjects, such as computed tomography ("CT") systems.

The x-ray device 100 includes an x-ray tube housing, or simply "housing," 102 that generally defines a cathode end 102A and an anode end 102B. The housing 102 further includes a pair of high voltage connections 104 configured and arranged so that a high voltage potential can be established between the cathode and the anode, discussed below. In addition, the housing 102 further includes a pair of fluid connections 106 configured and arranged so that a flow of coolant can be directed into one of the fluid connections 106, circulated within the housing 102 so as to cool components disposed within the housing 102, and then returned to an external cooling system by way of the other of the cooling connections 106. In the illustrated embodiment, the x-ray device 100 further includes the pair of trunnions 108 attached to the housing 102 so as to enable the attachment of the housing 102 to a gantry or other structure (See, e.g., FIG. 2A).

As well, an x-ray tube insert 200 is provided that is disposed within the housing 102 of the x-ray device 100. In general, the x-ray tube insert 200 is oriented within the housing 102 so as to be substantially aligned along the Z axis as shown. As further indicated in FIG. 1, the x-ray tube insert 200 is secured to an insert support 110 included in the housing 102. Various additional insert supports (not shown) may likewise be provided in this regard.

Directing more particular attention now to the x-ray tube insert 200, the illustrated embodiment includes a vacuum enclosure 202 which defines a window 202A through which x-rays generated by the x-ray tube insert 200 are directed. The window 202A comprises beryllium or another suitable material. A rotating anode 204 is disposed within the vacuum enclosure 202 and is supported by a bearing assembly 206 that is configured to attach at least indirectly to the insert support 110. A rotor 208 disposed about the bearing assembly 206 serves to impart a high speed rotation to the anode 204. Finally, a cathode 210, or other electron emitter, is positioned to direct a stream of electrons at a target track 204A of the anode 204. The target track is composed of tungsten or another suitable material.

In general, the cathode 210 and target track 204A are desired to be situated so that a focal spot, defined as the point of impact of the emitted electrons on the surface of the target track 204A, remains in a desired position relative to a detector or detector array. As discussed below however, the location of the focal spot relative to a detector, or detector array, of the x-ray device can change under certain conditions.

In operation, a high voltage potential established between the cathode 210 and the anode 204, by way of the high voltage connections 104, causes electrons emitted from the cathode 210 to accelerate rapidly towards the target track 204A of the anode 204, striking the target track 204A and causing x-rays to be emitted through the window 202A. Heat generated as a result of the operation of the x-ray tube insert 200 is removed by way of coolant flowing through the coolant connections 106.

II. Focal Spot Motion

As noted earlier, exemplary embodiments of the invention are concerned with the control of the Z axis positioning of the focal spot of devices such as are exemplified by the x-ray device 100. More particularly, such exemplary embodiments are concerned with the positioning of the focal spot relative to a detector, or detector array, of an x-ray device such as x-ray device 100. Directing attention now to FIG. 2A, details are provided concerning the relationship between, on the one hand, the relative positioning of the anode with respect to the housing and, on the other hand, the corresponding location of the focal spot relative to a detector array. As noted earlier, the quality of the radiographic image generated by a device such as x-ray device 100 is a function of the location of the focal spot relative to the detector or detector array.

Figure 2A:
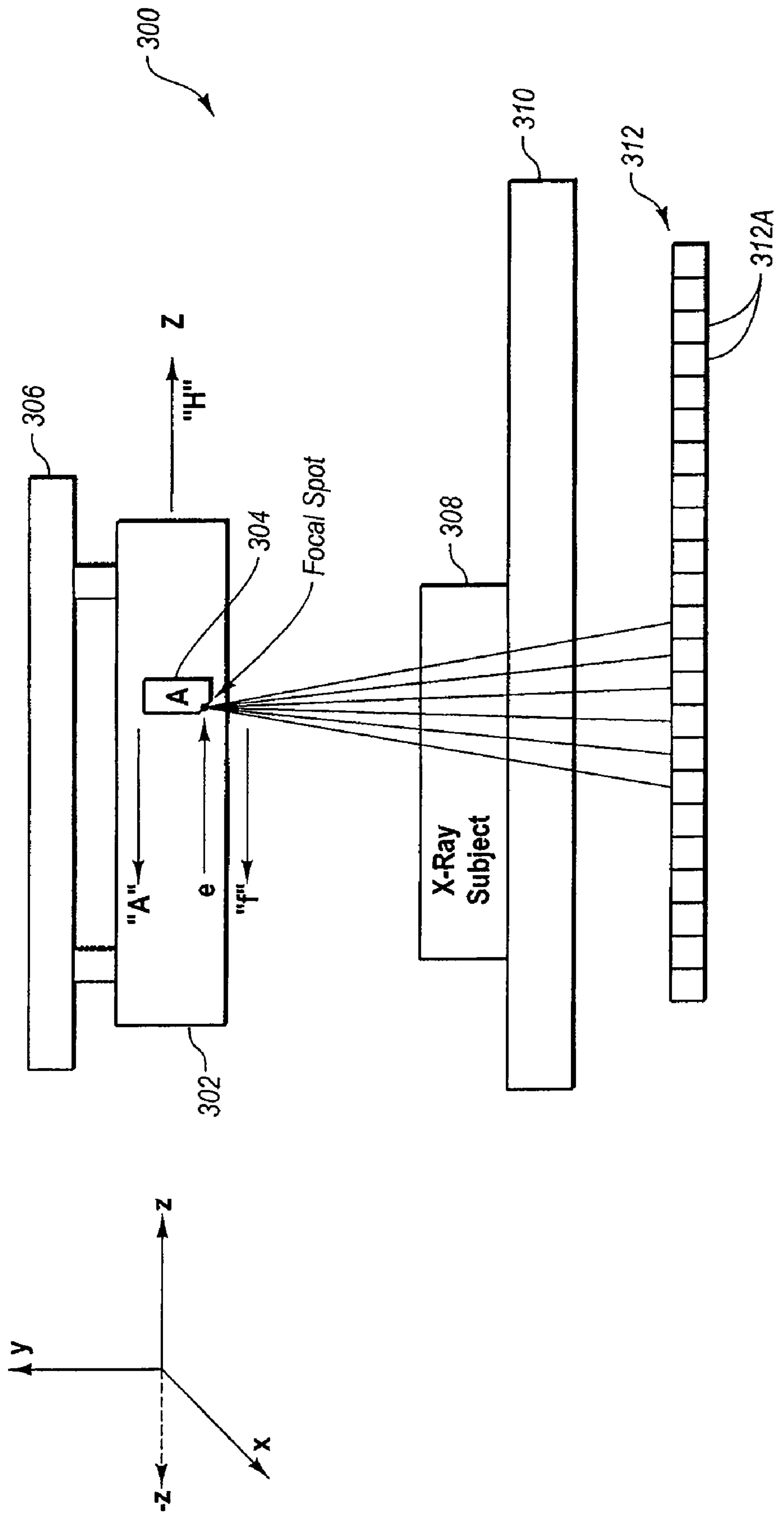
FIG. 2A is a diagram illustrating the relation of the distance between the cathode and the anode, and the location of the focal spot relative to a detector.

With more particular attention now to FIG. 2A, a schematic of an exemplary x-ray system is indicated generally at 300. Generally, the x-ray system 300 includes an x-ray tube housing 302 within which is disposed a cathode (not shown) and an anode assembly 304. The x-ray tube housing 302 is attached, either directly or indirectly, to a gantry 306 so that the position of the x-ray tube housing 302 relative to a subject 308 can be adjusted if desired. The subject 308 is positioned on a table 310 that is positioned so that x-rays originating from the focal spot of the anode assembly 304 will pass through the subject 308 and be detected by a detector array 312 that includes a plurality of detectors 312A.

In general, the information obtained by each detector 312A is compiled to produce the complete x-ray image. More particularly, and as suggested in FIG. 2A, the nature of the projection of the focal spot on a given detector 312A varies from one detector 312A to another, depending upon the position of the focal spot relative to the detector 312A. In this way, each detector provides a portion of the radiographic image. These various focal spot projections are then combined to produce the final, completed radiographic image.

As suggested by the foregoing, the particular projection of the focal spot on a detector 312A must remain substantially unchanged in order for the group of focal spot projections, when combined together, to produce a high quality image. In general, this result can be achieved by ensuring that a net Z axis movement of the anode 304 is minimized. Because the focal spot location on the Z axis is largely a function of anode 304 position, the focal spot position relative to the detector array 312 can be controlled by controlling the position of the anode 304.

More particularly, thermally induced motion of the anode assembly 304, denoted as direction "A," and the corresponding thermally induced motion of the focal spot, denoted as direction "f," must be controlled or compensation otherwise provided. As discussed below, such compensation can be achieved, for example, with a corresponding thermally induced motion of the x-ray tube housing 302 in direction "H" that is opposite the direction "A" and "f."

As the foregoing discussion of FIG. 2A suggests, various desirable effects can be achieved with respect to the positioning of the focal spot relative to the detector and, correspondingly, with respect to the quality of the radiographic images that can be generated by a particular device, by establishing and maintaining a substantially constant focal spot position. As discussed in further detail below, one way to facilitate achievement of this result concerns the selection and placement of suitable mounting structures for the housing of the x-ray device.

III. Thermally Based Housing Designs and Mounting Schemes

Figure 2B:
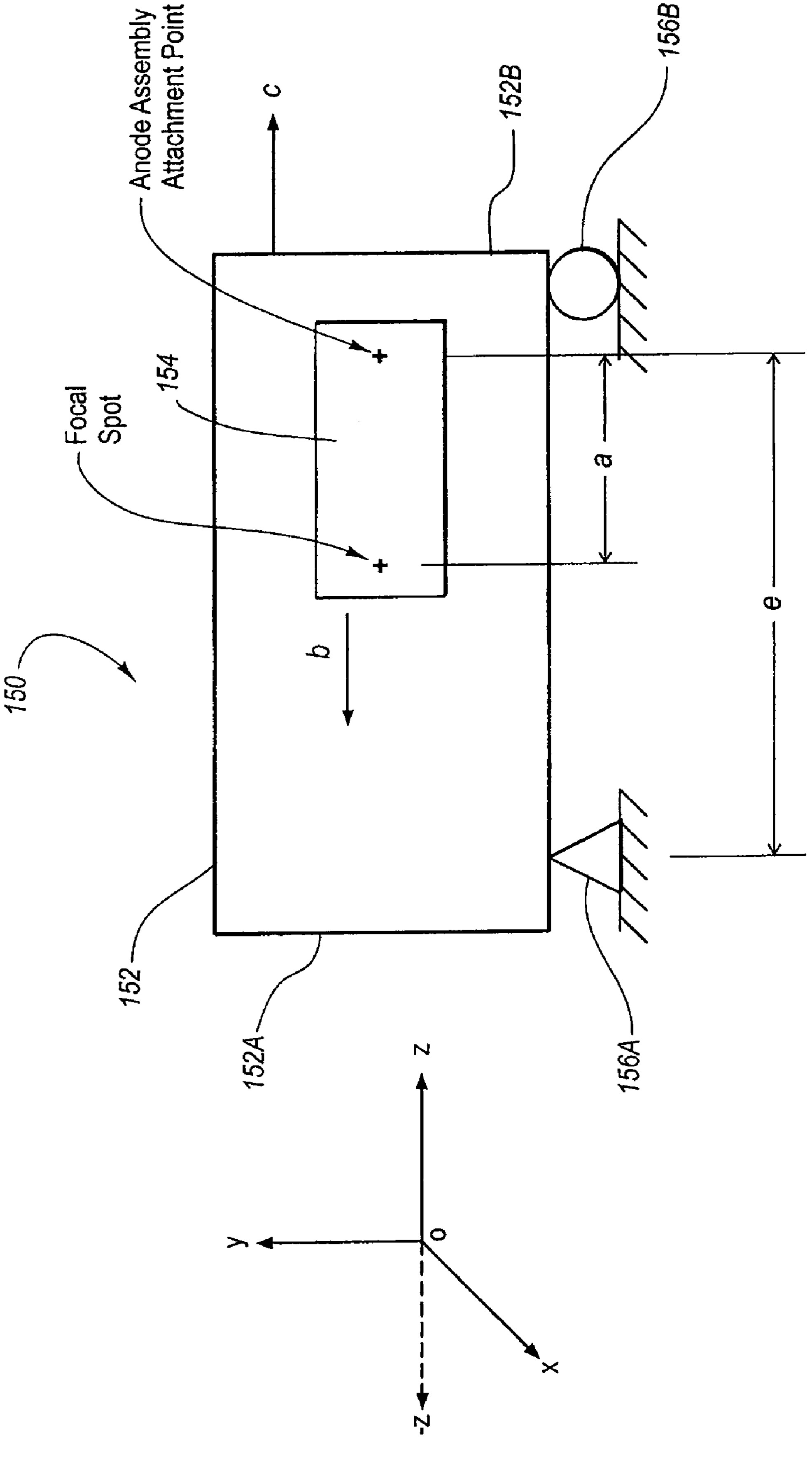
FIG. 2B is a schematic view illustrating an exemplary x-ray device mounting scheme for minimizing Z axis focal spot movement.

Directing attention now to FIG. 2B, details are provided concerning an exemplary mounting scheme for the housing of an x-ray device. As indicated, an x-ray device 150 is provided that includes a housing 152 within which is disposed an anode assembly 154. In general, the length of the housing 152 is arranged along the Z axis as shown. A distance "a" is defined that corresponds to a distance between an anode assembly attachment point, to the housing, and a focal spot location. A pair of mounts 156A and 156B, discussed in further detail below, are provided and serve to attach the housing 152 to a gantry or other structure (not shown).

During operation of the x-ray device 150, thermal expansion of the housing 152 tends to be greatest along the +Z axis, as indicated by the arrow denoted "b." In contrast, the anode assembly 154 tends to elongate or thermally expand in the −Z direction under the influence of the x-ray device 150 operating temperatures in the direction indicated by the arrow denoted "c." In order to ensure that the position of the anode assembly 154 and, thus, the location of the focal spot relative to the detector, remains relatively constant during a range of operation conditions, the geometry and materials selected for the housing 152 must be such that the thermally induced growth of the housing 152 in the +Z direction substantially offsets the thermally induced growth of the anode assembly 154 in the −Z direction.

Because the anode assembly 154 is joined to the housing 152 at the anode assembly attachment point, this effect can be achieved with judicious selection of housing materials and geometric features. Further, since the temperature of the anode assembly is typically much greater than that of the housing 152, it is useful in at least some cases to compensate for changes in the location of the anode assembly by selecting appropriate housing materials. Achievement of this offset is further facilitated by selection of appropriate mounts 156A and 156B, as well as suitable locations for the mounts.

In general, in order for thermally induced growth of the anode assembly to be adequately compensated for, or cancelled by, a corresponding change in the length of the x-ray device housing, the following thermal expansion relationship must be true:

$$\sum_{anode}(CTE)\times(\text{length})\times(\Delta T)=\sum_{housing}(CTE)\times(\text{length})\times(\Delta T)$$

That is, for a given temperature differential, the sum of the products of the coefficient of linear thermal expansion α, which may also be referred to herein by the shorthand notation "CTE," of the anode assembly components and the corresponding length of each component of the anode assembly must be equal to the sum of the products of the CTE of the housing components and the corresponding lengths of the housing components. The CTE refers to a percent change in the length of a component per degree of temperature change. For example, aluminum has a CTE of approximately $2.4\times10^{-5}$ (1/° C.).

Using the aforementioned thermal relationship, an appropriate CTE, and corresponding material(s), can be selected for the construction of the housing so as to compensate for a particular thermal expansion of an anode assembly. For example, aluminum or an aluminum alloy is used as the primary housing material in some implementations since aluminum has, among other things, a desirable CTE. As the foregoing relationship suggests, it is useful in at least some cases to select an undeformed length "e" and/or housing material with a relatively high CTE so that compensation for Z axis thermal expansion of the anode assembly can be readily achieved with the housing, notwithstanding relatively large Z axis expansions of the anode assembly. This is particularly true where it may be difficult or impractical to adjust dimension "a," that is, the distance from the focal spot to the point at which the anode assembly is mounted to the housing.

So long as the foregoing relationship is true then, the Z axis location of the focal spot relative to the detector will be substantially constant, since any thermally induced lengthening of the anode assembly 154 in the −Z axis direction is substantially offset by thermally induced lengthening of the housing 152 in the +Z axis direction. The following example serves to illustrate the operation of this relationship.

If it is assumed that the anode assembly increases in length 0.02 centimeters in the −Z direction ("cm") for the temperature differential, or ΔT, experienced by the anode assembly, then (CTE)×(L)×(ΔT) for the housing must be equal to 0.02 cm. Assuming a housing CTE of $2.5\times10^{-5}$ (corresponding to aluminum), and an unheated, or ambient, length of 15.0 cm for the housing, the ΔT that must be imposed on the housing to achieve an offsetting growth of 0.02 cm in the +Z direction is about 53° C. Thus, the housing must be maintained at an operating temperature of about 73° C. in order to provide the compensation necessary to maintain desired Z axis focal spot positioning.

In at least some instances, the maximum permissible temperature differential, and/or maximum temperature, to which the x-ray device may be exposed is set by regulation. For example, the maximum permissible housing temperature is sometimes set at about 85° C. Thus, given an ambient temperature of 20° C., the maximum ΔT for the housing would be about 65° C.

With respect to the foregoing thermal expansion relationship, it should be noted that the ΔT experienced by the anode assembly during normal x-ray device operations is often greater than the ΔT experienced by the housing of the x-ray device. This effect is largely due to the relatively higher level of thermal energy present on the surface of the target track.

Further, the interrelatedness of the two temperature differentials has a bearing on the use of modulation of the x-ray device housing temperature as a vehicle for facilitating control of the relative focal spot position. This interrelatedness, or correlation between the temperature differentials, may be enhanced, or attenuated, as desired. Thus, some exemplary implementations are designed in such a way that the ΔT experienced by the anode assembly during normal x-ray device operations is not closely correlated with the ΔT experienced by the housing of the x-ray device, so that a change in temperature of the x-ray device housing, such as may be implemented in connection with a method to control focal spot positioning through thermal expansion of the housing, may have little or no effect on the temperature of the anode assembly. In yet other cases however, it may be desirable to enhance the correlation between the ΔT experienced by the anode assembly during normal x-ray device operations and the ΔT experienced by the housing of the x-ray device. Accordingly, the scope of the invention is not limited to any particular implementation.

The extent of the correlation, which may be linear or non-linear or a combination of the two, between the ΔT experienced by the anode assembly during normal x-ray device operations and the ΔT experienced by the housing of the x-ray device can be selected and/or varied in a wide variety of ways. By way of example, the correlation can be specified and/or modified through the design and arrangement of the components of the x-ray device, the selection of materials for x-ray device components, and selection of the size and/or geometry of the x-ray device components. These, and other, variables lend considerable latitude to the design and implementation of systems, methods and devices for implementing x-ray device focal spot control.

The functionality of x-ray device designs developed in connection with the aforementioned relationship can be further enhanced by using information developed from that relationship to aid in the selection and placement of suitable mounting structures for elements of the x-ray device. With continuing attention to FIG. 2B, and directing attention also to FIG. 2C, details are provided concerning one exemplary x-ray device mounting scheme that facilitates thermally induced compensation for expansion of the anode assembly, so as to aid in the maintenance of a substantially constant focal spot position.

With regard to x-ray device mounting schemes generally, it is typically desirable to be able to constrain, or substantially prevent, thermally induced motion and/or growth in some directions along defined axes, while permitting thermally induced motion and/or growth in other directions along the defined axes. The particular arrangement employed in any given case is usually a function of variables such as, but not limited to, the CTEs of the various x-ray device components involved, operating temperatures, power input to the x-ray device, x-ray device component geometries, x-ray device component positioning and orientation, and the position, orientation and geometry of related structures such as the x-ray device gantry. Accordingly, the scope of the invention is not limited to the exemplary arrangements and types of mounts disclosed herein.

Figure 2C:
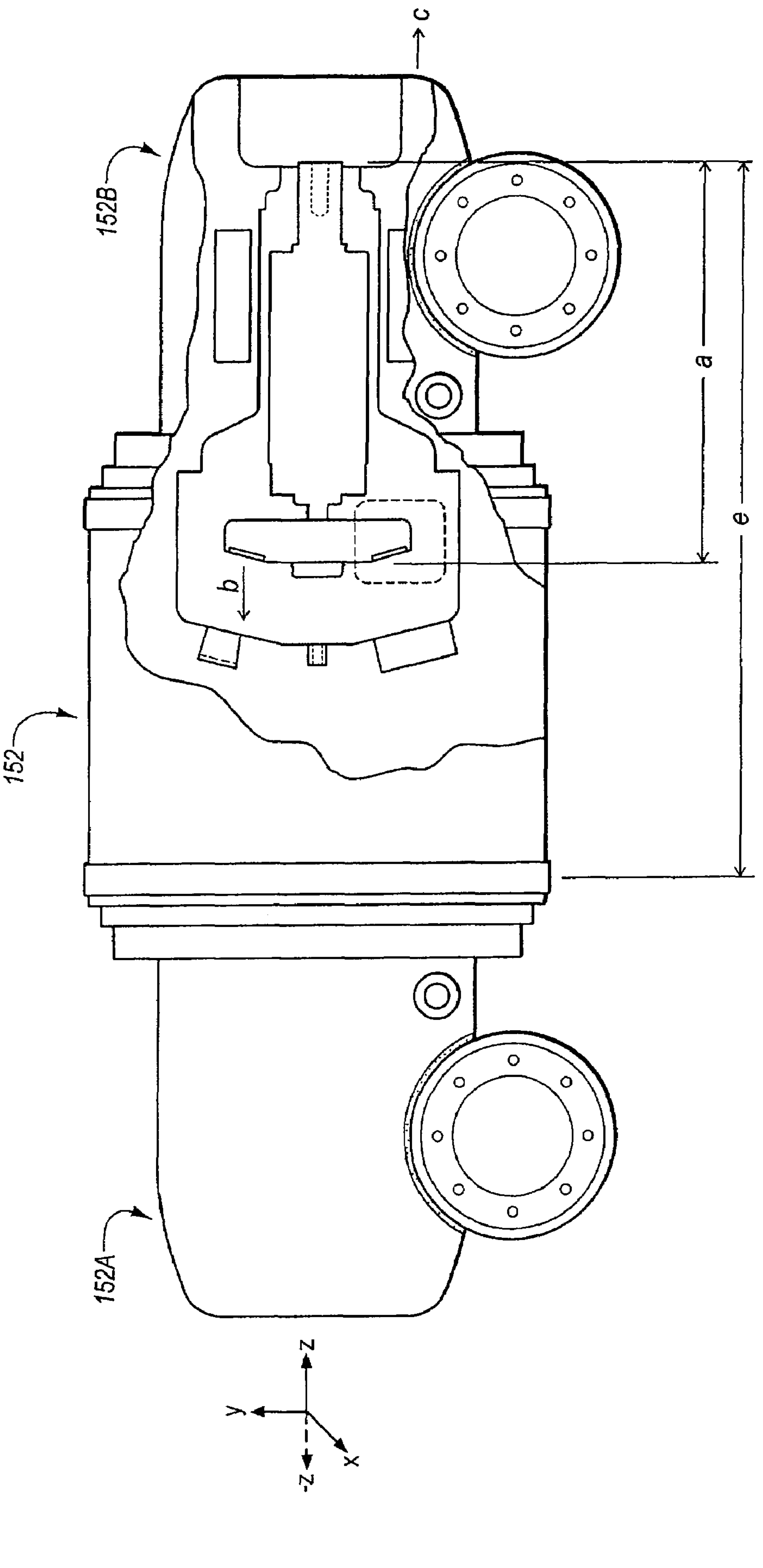
FIG. 2C is a partial cutaway view of an x-ray device showing the arrangement of the x-ray tube insert in the housing, and illustrating aspects of an exemplary mounting scheme.

With particular reference now to the exemplary arrangement illustrated in FIGS. 2B and 2C, a pair of mounts 156A and 156B are provided that generally serve to attach the x-ray device 150 to a structure, such as a gantry for example (See FIG. 2A). Of course, additional or fewer mounts may be employed, depending upon the particular application. In the illustrated implementation, the x-ray device is supported so as to facilitate or enable thermally induced motion of the anode end 152B of the housing 152 in the +Z direction to the extent implicated by the relationship discussed above, and thereby substantially offset thermally induced motion of the anode assembly 154 in the opposite, or −Z, direction.

More particularly, the exemplary mount 156A is implemented as a fixed mount attached proximate to the cathode end 152A of the housing 152 and configured to substantially constrain motion of the housing 152 along the X, Y, and Z axes. In one alternative implementation, the mount 156A substantially constrains motion of the housing 152 along at least the Z axis. On the other hand, the mount 156B is configured and arranged so that motion of the anode end 152B of the housing 152 is constrained only in the X and Y directions, while the anode end 152B of the housing 152 is free to move in either direction along the Z axis. As a result of this combination and positioning of mounts 156A and 156B, thermally induced motion of the housing 152 in the +Z direction is enabled to the extent necessary to compensate for −Z axis motion of the anode assembly 154. Further, use of the roller mount 156B also enables contraction of the housing 152 in the −Z direction as the x-ray device 150 cools.

While the foregoing exemplary implementations are largely concerned with thermally based control of Z axis focal spot positioning, the scope of the invention is not so limited. Rather, the disclosure herein is equally well suited for application to thermally based control of the X and/or Y axis location of the focal spot. Moreover, embodiments of the invention are not limited solely to focal spot control. Rather, the disclosure herein can be readily applied to thermally based control of the X, Y and/or Z axis location of any other desired point(s) on, or associated with, devices such as, but not limited to, x-ray devices.

Figure 2D:
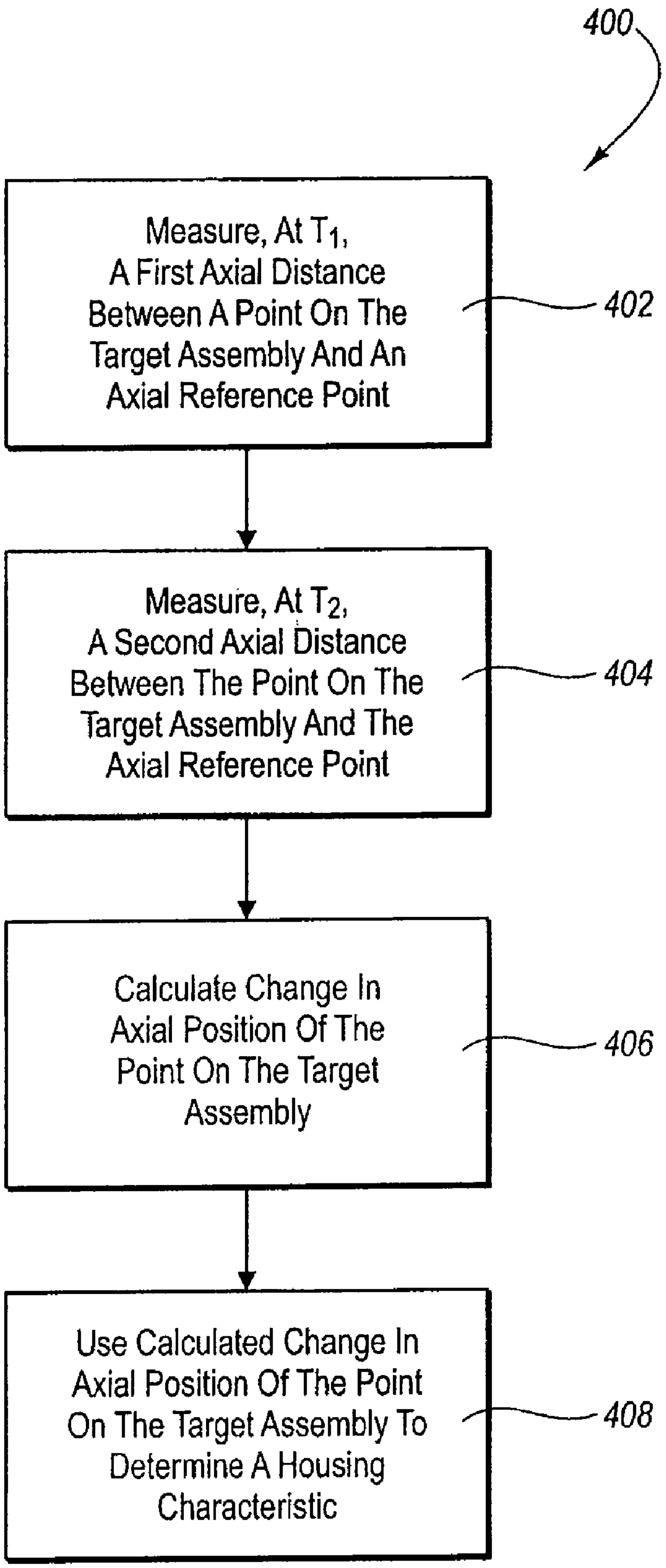
FIG. 2D is a flow diagram illustrating an exemplary method for obtaining information useful in determining x-ray housing mount types and locations.

With the foregoing considerations concerning the mounting, materials, and arrangement of the housing 152 relative to the anode assembly 154 in view, attention is directed now to FIG. 2D where details are provided concerning one embodiment of a process for designing a mounting configuration for an x-ray housing so as to minimize Z axis focal spot location changes during operation of the x-ray device. As indicated in FIG. 2D, the method 400 commences at stage 402 where, at temperature $T_1$, a first axial distance between a point on the anode assembly, such as the focal spot location, and an axial reference point is measured. At stage 404, the process is repeated for a second temperature $T_2$.

Next, the process 400 enters stage 406 where a change in the axial position of the point on the anode assembly is calculated by taking the difference between the axial distance measure at stage 402 and the axial distance measured at stage 404. In one exemplary implementation of the method 400, temperature $T_1$ corresponds to an ambient temperature, such as 20° C., while temperature $T_2$ corresponds to an operating temperature, such as 85° C.

The change in the Z axis position of the predetermined point of the anode assembly that is measured between temperatures $T_1$ and $T_2$ thus represents the Z axis growth of the anode assembly, also referred to herein as the "target assembly," in the −Z direction, that is, towards the cathode. As noted elsewhere herein, this axial change in the −Z direction can then be used to determine various characteristics of the x-ray device housing so that the housing can be selected and implemented in such a way as to counteract or offset the calculated Z axis growth of the anode assembly.

Accordingly, the process 400 then advances to stage 408 where the change in the Z axis position of the point on the anode assembly is used as a basis for determining one or more housing characteristics. For example, if the total change in the length of the anode assembly is known, that number can, as noted earlier, be set equal to the CTE of the housing multiplied by the change in temperature experienced by the housing, to determine the length of the housing. Alternatively, the change in the length of the anode assembly can be set equal to the length of the housing multiplied by the change in temperature experienced by the housing, to determine the coefficient of thermal expansion and, thus, the required material, or a group of suitable materials, for the housing.

In similar fashion, and with continuing reference to FIGS. 2B through 2D, the temperature differential information, in conjunction with the coefficient of thermal expansion for the anode assembly and the x-ray tube housing, can be used as an aide in determining the location of mount 156A. In particular, if it is assumed that the coefficient of thermal expansion for the anode assembly is known, as well as the dimension "a" (FIGS. 2B and 2C), and the temperature differential experienced by the anode assembly, that information can be used to determine the location "b" of a fixed mount 156A relative to the point at which the anode assembly is attached to housing, if the coefficient thermal expansion of the housing is known and if the temperature differential experienced by the housing is known as well. This relationship can be summarized as follows:

$$\sum_{insert}(CTE)\times(a)\times(\Delta T)=\sum_{housing}(CTE)\times(b)\times(\Delta T)$$

The mount 156B can then be located in any suitable location and/or position. As noted earlier, the mount 156B is implemented as a roller mount in some cases.

IV. Open Loop Control Systems

Figure 3A:
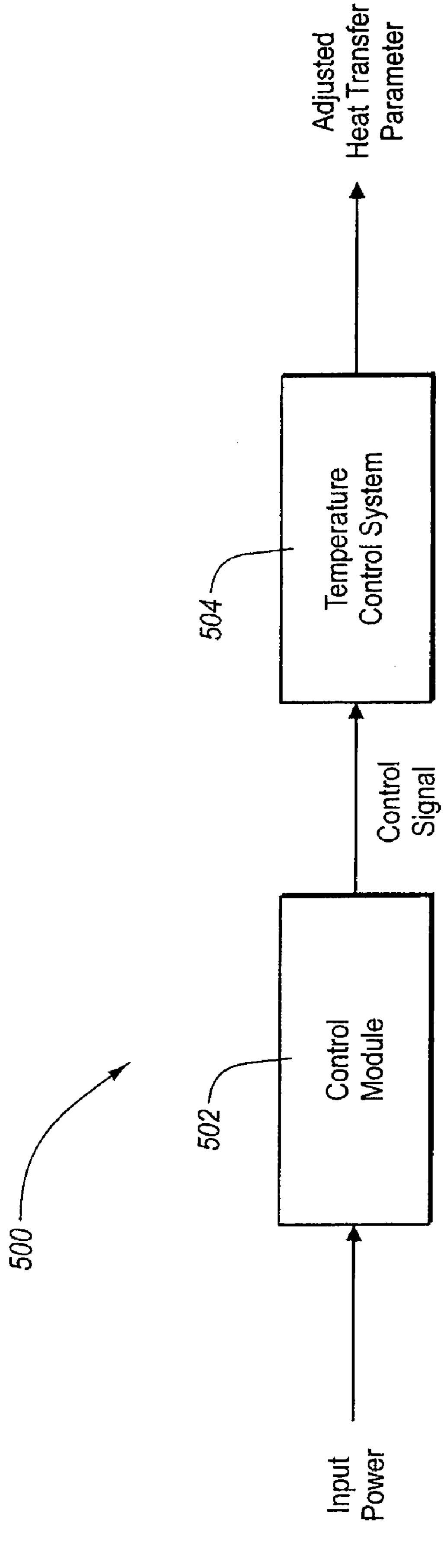
FIG. 3A is a schematic diagram of exemplary passive open loop control system that uses x-ray device input power as a basis for Z axis focal spot location control.
Figure 3B:
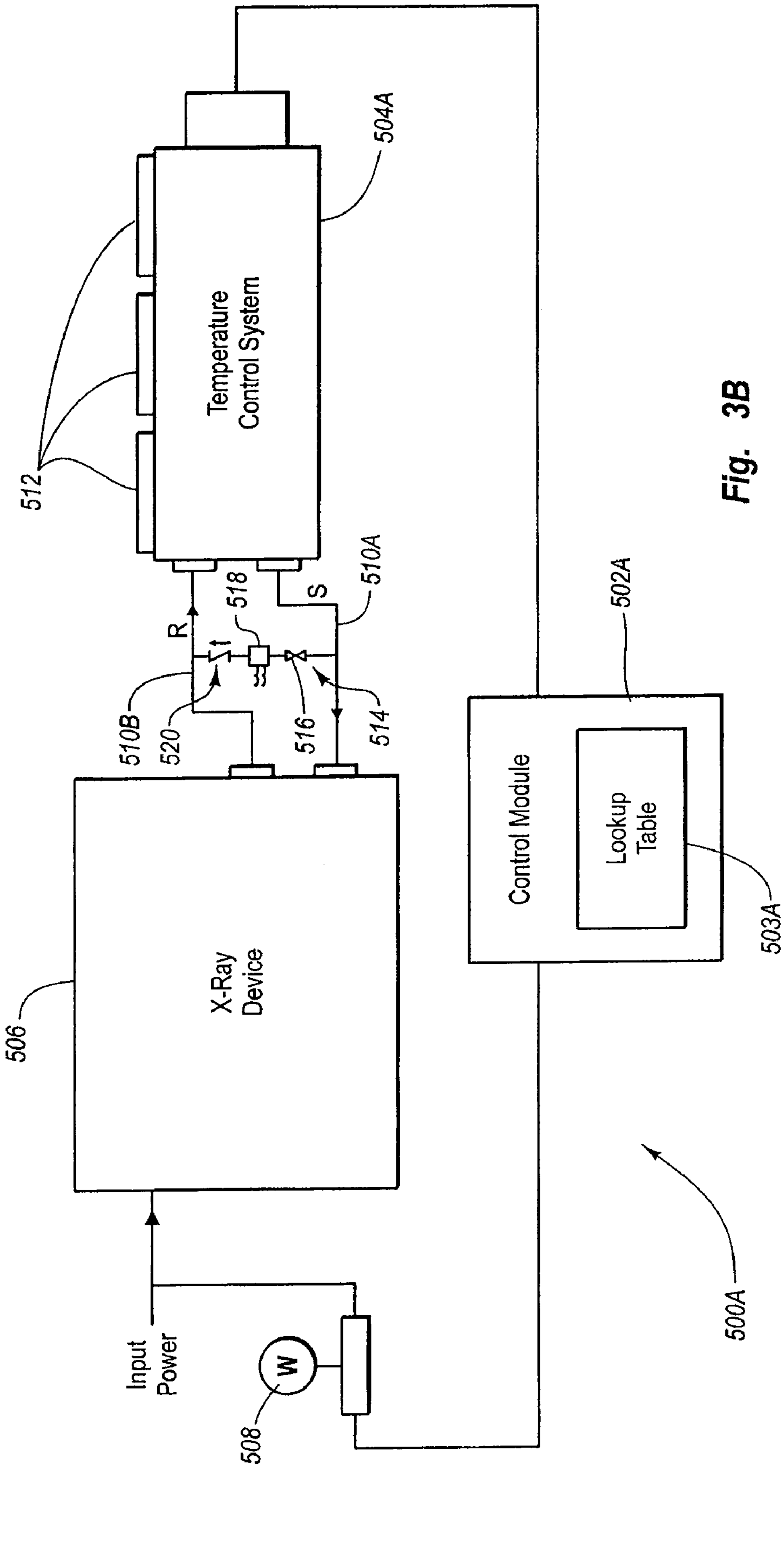
FIG. 3B is a schematic view of an exemplary physical implementation of the system illustrated in FIG. 3A.

With attention now FIGS. 3A and 3B, details are provided concerning an exemplary open loop control system such as may be employed in connection with the thermally based control of Z axis focal spot positioning. The exemplary open loop control system, denoted generally at 500, includes a control module 502 and a temperature control system 504, or any other suitable system or device for controlling the temperature of one or more components of an x-ray device.

In some implementations, the temperature control system 504 includes a fluid circuit, fluid pump, and associated valves and instrumentation (not shown), for directing a flow of coolant through the x-ray device. The temperature control system 504 may also include one or more fans configured to direct a flow of air over portions of the fluid circuit so as to remove at least some heat from the fluid flowing through the fluid circuit. The fans are connected with suitable control and power circuitry so that their operation and performance can be readily controlled. The scope of the invention is not, however, limited to any particular type or implementation of temperature control system.

Note that as used herein, "fluid" refers to liquids, gases, and combinations thereof. For example, some implementations of the temperature control system 504 may use refrigerants which, during the various stages of operation of the temperature control system 504, may substantially comprise a liquid phase, a gas phase, and/or a combination liquid/gas phase.

The control module 502 may be any programmed, or programmable, device capable of implementing the functionality disclosed herein. As indicated in FIG. 3A, the control module 502 includes an input port and an output port. The output port of the control module 502 communicates with the input port of the temperature control system 504.

More particularly, the control module 502 is configured to receive, at the input side, a signal that corresponds to the input power applied to the x-ray device. This input signal may be either digital or analog. Based upon the magnitude, or other parameter, of the input power signal received at the input side, the control module 502 then generates a corresponding control signal which is output from the control module 502 and directed to an input control port of the temperature control system 504. A processor or other suitable device (not shown) associated with the temperature control system 504 then receives the control signal from the control module 502 and, depending upon the value associated with the received control signal, causes the temperature control system 504 to adjust a heat transfer parameter associated with the x-ray device.

While the aforementioned exemplary open loop control system uses measured input power to the x-ray device as a basis for control of focal spot location, the scope of the invention is not so limited. Rather, a wide variety of other open loop control systems may be employed that are effective in implementing functionality comparable to that of the open loop control system 500. By way of example, open loop control systems are implemented in other embodiments that use x-ray device parameters other than input power as a basis for focal spot location control.

In one such embodiment, the open loop control system uses a thermal model of the x-ray device to implement such control. In this embodiment, information concerning the thermal state of the x-ray device is received at the open loop control system, such as by way of thermocouples or similar devices, and then compared with the thermal model. Such thermal state information may include, for example, anode and/or housing temperatures. Depending upon the results of the comparison, appropriate changes are then implemented to one or more heat transfer parameters. This process repeats until the behavior of the x-ray device reaches an acceptable level of correspondence to the thermal model.

In general then, any x-ray device parameter which can be correlated, either directly or indirectly, with focal spot position can be employed in an open loop control system. Accordingly, the invention is not limited to the use of input power and thermal models as bases for control of focal spot positioning.

Consideration will now be given to an exemplary physical implementation of an open loop control system. In particular, attention is directed to FIG. 3B where an exemplary open loop control system 500A is illustrated that includes a control module 502A having a lookup table 503A, as well as a temperature control system 504A. As further indicated in FIG. 3B, the temperature control system 504A is configured for fluid communication with the x-ray device 506 which includes, on an input power side, a wattmeter 508 or other suitable device for indicating the input power to x-ray device 506.

With more particular attention first to the control module 502A, the control module 502A includes, for example, a processor, a memory device and suitable input and output connections. The control module 502A further includes suitable programming and/or logic to carry out the functionality disclosed herein. In connection with the operation of the control module 502A, a lookup table 503A is provided as part of, or accessible by, the control module 502A and includes a listing of various input power levels that may be employed, or could be experienced, by the x-ray device 506 in connection with x-ray device operations. Further, the lookup table 503A exemplarily includes a different heat transfer correction factor corresponding to each of the input power levels. In general, the heat transfer correction factor refers to a parameter, coefficient, value, or other indicator that represents the difference or variation between a measured input power value, known to correspond to a particular focal spot location, and a desired input power value that corresponds to the desired or optimal focal spot location.

In some exemplary implementations, the heat transfer correction factors are empirically obtained, such as by varying the power supplied to the x-ray device and then observing and recording the effect of the input power levels, and/or changes between input power levels, on x-ray device parameters such as focal spot positioning, and thermal growth of x-ray device components. Further details concerning the determination and use of heat transfer correction factors are disclosed elsewhere herein.

When employed in connection with the operation of the temperature control system 504A, the heat transfer correction factor is used to drive the operation of the temperature control system 504A as a function of the input power to the x-ray device 506. As discussed in further detail below in connection with the temperature control system 504A, the heat transfer correction factor may influence the operation of the temperature control system 504A in a variety of different ways. Further, details concerning a process for generating the lookup table 503A are provided below in connection with the discussion of FIG. 3C.

Turning now to the temperature control system 504A, the illustrated embodiment includes a fluid circuit that is configured for fluid communication with the x-ray device by way of a supply and return lines 510A and 510B, respectively, which generally enable the transfer of cooled fluid to the x-ray device 506 and the removal of heated fluid from the x-ray device 506 and return of the heated fluid to the temperature control system 504A. In addition, the temperature control system 504A includes a plurality of electronically operated fans 512 which serve as the primary, or in some cases supplemental, vehicle to cool fluid returning from the x-ray device 506 to the temperature control system 504A.

Thus, desirable cooling effects with respect to the x-ray device 506 can be achieved, for example, by modulating the current flow to one or more of the fans 512, thereby adjusting the efficiency of the temperature control system 504A. As suggested earlier, one way to control the efficiency of the temperature control system 504A in this manner is through the use of the heat transfer correction factor. More particularly, a control signal generated by the control module 502A in accordance with information provided in the lookup table 503A causes a heat transfer parameter, such as the efficiency, associated with the temperature control system 504A to be adjusted by controlling the power to one or more of the fans 512.

Thus, the exemplary system illustrated in FIGS. 3A and 3B is open loop in the sense that no output from the x-ray device 506 is in employed in connection with the control of the temperature of the x-ray device 506. Rather, control of the temperature of the x-ray device 506 is predicated on the magnitude of the input power to the x-ray device 506 which, as discussed above, is in used as the basis for controlling the efficiency of the temperature control system 504A, and thus, the temperature of the x-ray device 506.

In this way, the relationship between the input power to the x-ray device 506 and the temperature of the x-ray device 506 can be advantageously employed. As discussed in further detail below in connection with FIG. 3C, the temperature of the x-ray device 506, in turn, places a major role in the relative Z axis position of the focal spot of the x-ray device 506.

Thus, in the implementation collectively illustrated in FIGS. 3A and 3B, a system is provided for controlling Z axis focal spot positioning based upon input power to the x-ray device 506 and the cooling efficiency, or other performance parameter, of the temperature control system 504A. As to the operation of the temperature control system 504A, various other heat transfer parameters besides the efficiency of the temperature control system 504A may be adjusted so as to achieve desired cooling effects with respect to the x-ray device 506.

By way of example, some embodiments of the invention provide for regulating the flow rate of coolant between the temperature control system 504A and the x-ray device 506 as a method to change the temperature of the x-ray device 506. This approach is based on the notion that heat transfer is a function of mass flow rate so that, if all other variables are held, a relative increase in the coolant mass flow rate will result in an increase in heat transfer away from the x-ray device 506 and, correspondingly, a decrease in the temperature of the x-ray device 506. Similarly, a reduction in the mass flow rate of the coolant will result in an increase in the temperature of the x-ray device 506.

In another, related, embodiment of the invention, the total coolant mass flow rate of the temperature control system 504A remains relatively constant. In this implementation, control of the x-ray device temperature is achieved by way of a bypass line that directs a predetermined amount of coolant around the x-ray device and back to the temperature control system 504A. Thus, the temperature of the x-ray device can be readily adjusted by varying the amount of coolant that bypasses the x-ray device.

With continuing attention to FIG. 3B, details are providing concerning one exemplary bypass arrangement. In particular, a bypass line 514 is connected between the supply and return lines 510A and 510B as shown. An isolation valve 516 is provided that can be used to secure the bypass line 514 if desired. A flow control device 518 is positioned downstream of the isolation valve 516 and serves to regulate the amount of coolant passing through the bypass line.

The flow control device 518, which may be implemented as a solenoid valve or any other suitable device, is controlled by the temperature control system 512, in response to a control signal received at the temperature control system 512 from the control module 502A. In other cases, it may be desirable to control the flow control device 518 directly with the control module 502A.

The bypass line 514 additionally includes a check valve 520, or comparable device, downstream of the flow control device 518 and isolation valve 516. In general, the check valve 520 prevents the backflow of returning coolant into the bypass line 514 and/or supply line 510A.

Figure 3C:
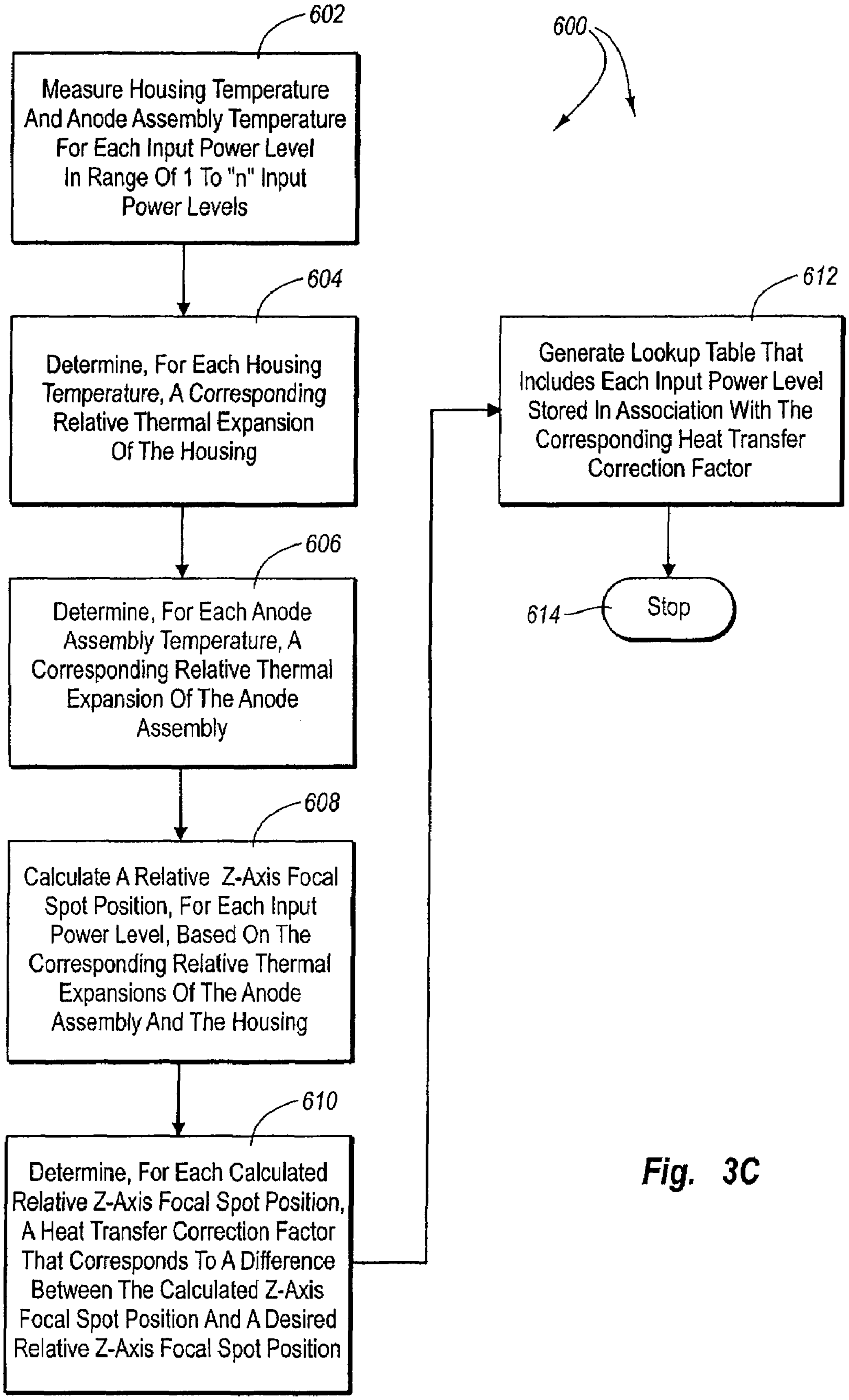
FIG. 3C is a flow diagram illustrating an exemplary method for calibrating a passive open loop control system such as is illustrated in FIG. 3B.

It should be noted that the bypass arrangement indicate in FIG. 3C is exemplary only and is not intended to limit the scope of the invention in any way. Instead, any other bypass arrangement, or other system or device of comparable functionality, may likewise be employed.

Figure 3D:
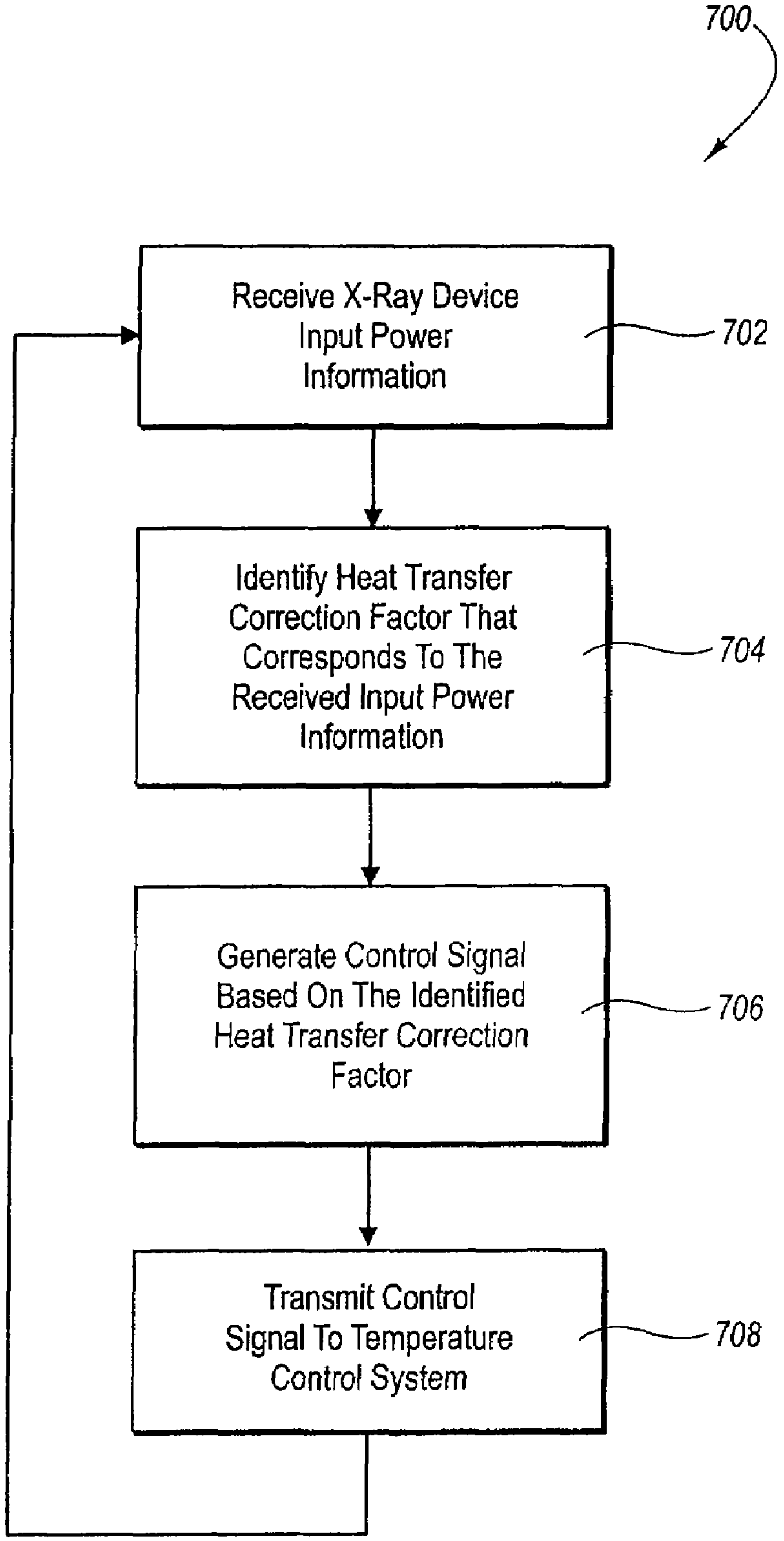
FIG. 3D is a flow diagram illustrating an exemplary method for Z axis focal spot location control such as may be implemented in connection with the system illustrated in FIG. 3B.

With attention now to FIGS. 3C and 3D, further details are provided concerning processes implemented in connection with exemplary systems such as those shown in FIGS. 3A and 3B. With particular attention first to FIG. 3C, an exemplarily process 600 is illustrated for generating data for a lookup table such as the lookup table 503A discussed above in connection with FIG. 3B.

At stage 602 of the process, the input power level to the x-ray device is varied over a range of one to "n" input power levels and the x-ray device housing temperature and anode assembly housing temperature measured at each different input power level. At stage 604 of the process, a determination is made, for each different x-ray device housing temperature, as to the corresponding relative thermal expansion of the x-ray device housing. This determination can be made in various ways.

For example, the determination can be made empirically by simply measuring the change in the length of the housing relative to the length of the housing observed at a different temperature. Alternatively, the relationships disclosed elsewhere herein can be used to calculate the length of the housing based upon the coefficient of the thermal expansion of the housing and the temperature to which the x-ray device housing was exposed. Various other methods may also be employed to determine the corresponding relative thermal expansion of the housing at a particular housing temperature.

In similar fashion, at stage 606, the corresponding relative thermal expansion of the anode assembly is determined at each different anode assembly temperature. Then, at stage 608, the Z axis focal spot position, for each different input power level or temperature, is then determined based upon the corresponding relative thermal expansions of the anode assembly and the x-ray device housing.

In particular, the Z axis position of the focal spot relative to the detector changes as a function of the thermal expansion of the anode assembly. Thus, by knowing the relative thermal expansions of the anode assembly and the x-ray device housing at each of a variety of different temperatures, the Z axis position of the focal spot relative to the detector can be readily derived.

As discussed herein, the Z axis focal spot position relative to the detector should remain substantially constant over a range of operating conditions. Further, due to the geometry and composition of the anode assembly and the housing, it is typically the case that there is either a single temperature or relatively narrow range of temperatures over which the focal spot is thus located. Accordingly, for temperatures or thermal expansions outside of the desired range, a correction must be made so that the focal spot remains in the desired position over a range of operating temperatures and input powers.

Accordingly, stage 610 of the process 600 is concerned with determining appropriate correction factors. More particularly, stage 610 involves the determination, for each calculated Z axis focal spot position, a heat transfer correction factor that corresponds to a difference between the calculated Z axis focal spot position and the desired Z axis focal spot position. This correction factor takes into account the geometry and composition of, in at least some embodiments, the anode assembly and the x-ray device housing. The following example serves to further illustrate this idea.

If it is determined, for example, that at a temperature $T_1$ the Z axis focal spot position has moved, as a result of anode assembly expansion, in the −Z direction relative to the detector, such movement of the anode assembly must be compensated for by heating the x-ray device housing so that the thermal expansion of the x-ray device housing will counteract or cancel out the motion of the anode assembly towards the cathode. That is, the temperature of the x-ray device housing must be increased in order ensure that the focal spot is properly positioned relative to the detector. The specific extent to which the x-ray device housing must be heated is specified by, or implicated by way of, the heat transfer correction factor.

The same is likewise true if it is determined that the Z axis focal spot position has moved in the +Z direction relative to the detector. In this case, a decrease in the heat load on the x-ray device housing causes the x-ray device housing to contract in the −Z direction to compensate for the +Z movement of the focal spot. As in the prior example, an appropriate heat transfer correction factor specifies or implies the amount of heat that must be removed from the x-ray device housing to achieve this result. In this way, heat transfer correction factors that are determined either empirically or calculated can be used as inputs to a system, such as the system illustrated in FIGS. 3A and 3B for example, to control the relative Z axis position of the focal spot.

At stage 612 of the process 600, a lookup table is generated that includes each input power level stored in association with the corresponding heat transfer correction factor. Thus, when a system such as that illustrated in FIGS. 3A and 3B detects a particular input power level, the lookup table can be accessed and appropriate changes made to the temperature of the x-ray device so that a desired relative Z axis movement of the focal spot can be implemented. Further details concerning this process are provided below in connection with the discussion of FIG. 3D. After generation of the lookup table, the process terminates at stage 614.

Turning now to FIG. 3D, details are provided concerning a process 700 for using information stored in a lookup table such as that described above in connection with FIG. 3C. The process 700 is suitable for use in connection with a variety of different control systems, examples of which are illustrated in FIGS. 3A and 3B. At stage 702 of the process, information is received concerning the input power to the x-ray device. Such information may take the form of a digital or analog signal and may reflect directly the input power, such as a watt reading or, alternatively, may take the form of a signal proportional to, or otherwise indicative of, the input power to the x-ray device. At stage 704, a heat transfer correction factor that corresponds to the received input power information is identified. In at least some embodiments, identification of the heat transfer correction factor is performed by accessing a lookup table that includes various input power levels and corresponding heat transfer correction factors.

Once the appropriate heat transfer correction factor has been correlated with received input power information, a control signal is then generated based on that heat transfer correction factor. As with other signals generated and employed in connection with the systems disclosed herein, the control signal may be either a digital or analog signal and, in general, reflects changes to the temperature of the x-ray device that are to be implemented by a system such as the temperature control system disclosed herein.

By way of example, the control signal may specify such things as the speed with which the desired change in temperatures to be implemented, as well as the desired final temperature. Typically, the control signal embodies instructions to the temperature control system to modify the temperature of the x-ray device to the extent necessary to ensure that the focal spot is optimally positioned on the Z axis relative to the target surface. However, other control signals may be generated where it is desired to change the Z axis focal spot location to a less then optimal position, or to maintain the Z axis focal spot at a less then optimal position.

In any case, the generated control signal is then transmitted to the cooling system which then implements the action(s) necessary to adjust the temperature of the x-ray device as necessary. As noted above, such actions may include, but are not limited to, changing the mass flow rate of a coolant of the cooling system and/or modifying the cooling efficiency of the cooling system. In yet other exemplary implementations, one or more thermal switches are employed that sequentially activate temperature control system fans at predetermined temperatures so as to provide a nonlinear cooling.

V. Closed Loop Control Systems

Figure 4A:
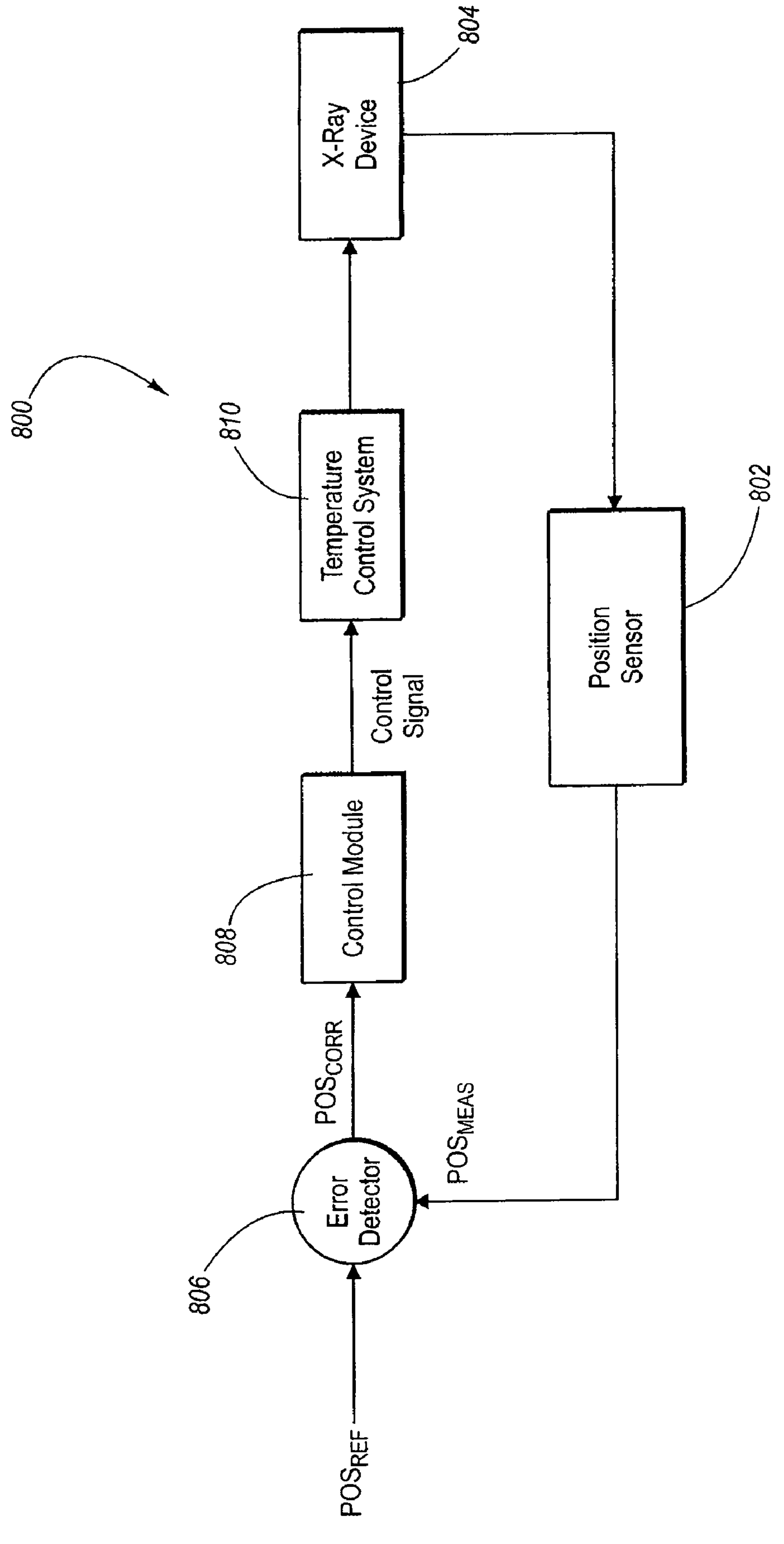
FIG. 4A is a schematic diagram of exemplary passive closed loop control system that monitors and corrects the x-ray device Z axis focal spot position.

With attention now to FIG. 4A, aspects of an exemplary closed loop control system for use in monitoring and adjusting the relative Z axis focal spot position are provided. In general, operation of the illustrated system is based upon direct measurement of the Z axis focal spot location and, accordingly, may also be referred to herein as an active system. In contrast, where thermal motion of the anode assembly is based on predicted or calculated values, systems operating in that manner may be referred to herein as passive systems.

The illustrated embodiment of the closed loop control system 800 includes a Z axis position sensor 802 or comparable device, which may be mounted to the gantry or other structure, configured and arranged to measure the distance of, for example, position of the anode assembly relative to a reference position of the x-ray device 804. An output of the position sensor 802 is connected with an error detector 806 input. More particularly, a measured position signal $POS_{MEAS}$ is generated and transmitted by the position sensor 802 to the error detector 806.

In addition, the error detector 806 is configured with another input to receive a reference position signal $POS_{REF}$ or other input which can then be compared with the measured position input generated by the position sensor 802. Correspondingly, the error detector 806 includes an output connection configured to provide a corrected position signal $POS_{CORR}$ to a control module 808.

The control module 808 then processes the received $POS_{CORR}$ signal and generates a corresponding control signal which is directed to an input of the temperature control system 810. The temperature control system 810 is then able to adjust, consistent with the received control signal, one or more heat transfer parameters as necessary to modify the temperature of the x-ray device 804. As noted earlier, such adjustments may be accomplished in various ways including, but not limited to, adjusting the efficiency of temperature control system, such as by controlling current flow to the fans of the temperature control system 810, and/or by modulating the coolant mass flow rate associated with the temperature control system 810.

As in the case of other embodiments of the invention, the control module 808 is programmed so that, regardless of input received from the position sensor 802 or other sensors concerning Z axis focal spot location, the control module 802 will not permit the temperature of the x-ray device 804 to rise beyond a certain predetermined point. In this way, the control module 808 operates within various predefined safety confines while also affording desirable modification to the temperature of the x-ray device 804. In at least one exemplary implementation, this high temperature control functionality is implemented by way of a thermal sensor or thermocouple that is placed in communication with cooling oil contained within the x-ray device housing.

In some cases, the actual temperature of the x-ray device 804 is not of so much interest as the change in temperature of the x-ray device housing from a predetermined reference point, such as ambient temperature. In this case the thermal sensor or thermocouple is a differential device that senses and provides output concerning the temperature differential between the x-ray device 804 and a predetermined reference point such as the ambient temperature.

Figure 4B:
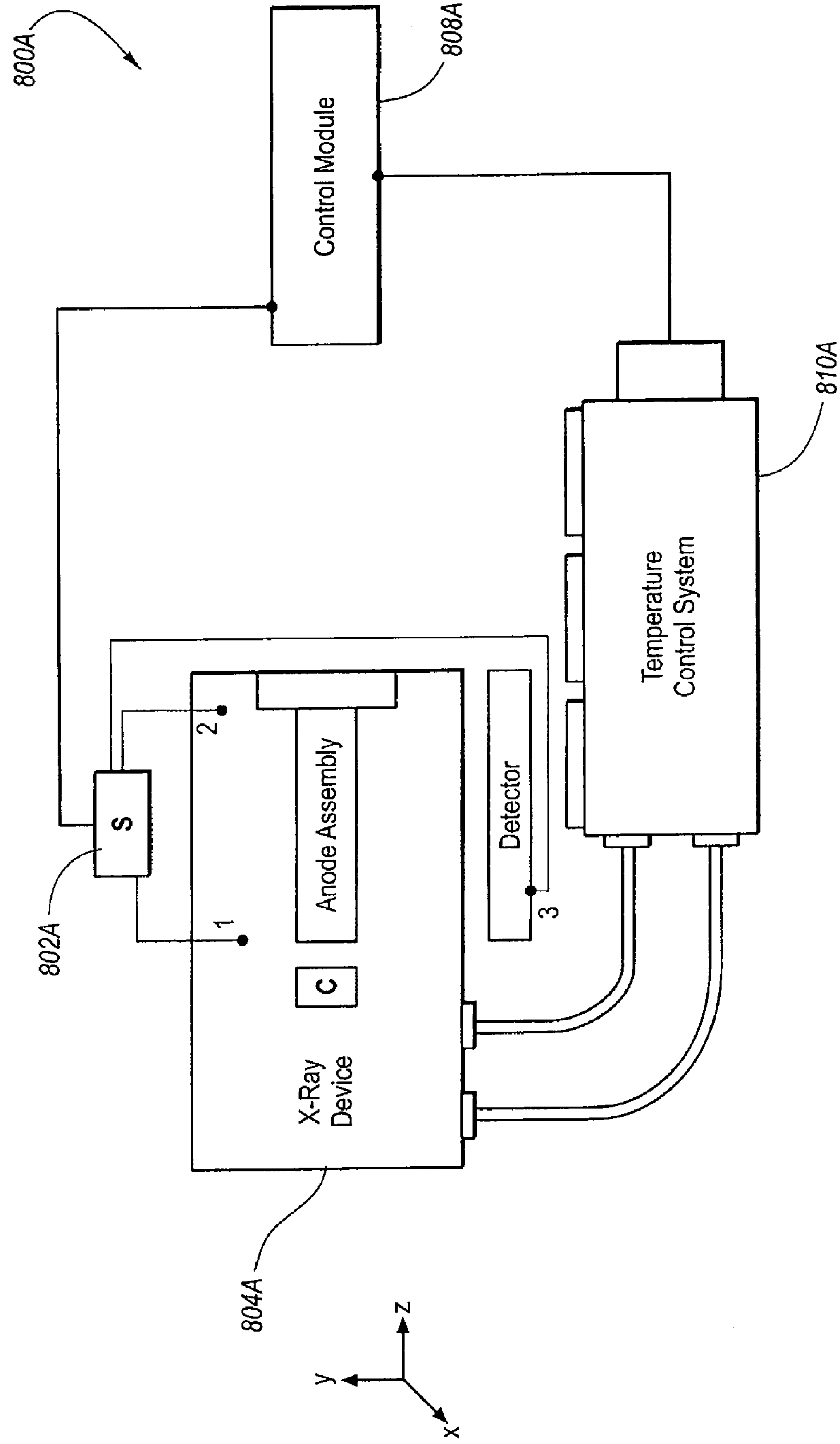
FIG. 4B is a schematic view of an exemplary physical implementation of the system illustrated in FIG. 4A.

With attention now to FIG. 4B, details are provided concerning an exemplary physical implementation of the closed loop control system 800 illustrated in FIG. 4A. As indicated in FIG. 4B, the closed loop control system 800A includes a position sensor 802A generally configured to monitor and report on the positioning of various components within the x-ray device 804A. The position sensor 802A is configured for communication with a control module 808A which, in turn, is arranged for communication with the temperature control system 810A.

As more particularly indicated in FIG. 4B, the exemplary position sensor 802A, which may be implemented as a transducer or any other suitable device(s), includes one or more pickups or wires 1 and 2 positioned and arranged so as to be able to gather or sense, and transmit to the position sensor 802A, information concerning relative positioning of various components of the x-ray device 804A. By way of example, pickups 1 and 3, or a comparable system or device, report on the Z axis position of the focal spot relative to a detector, or detector array.

In an alternative embodiment, the pickups 1 and 2 collectively report on a relative Z axis distance between a predetermined point on the anode assembly, such as the location of the focal spot on the target track, and a predetermined point on the gantry (not shown). Because the location of the focal spot typically does not change significantly relative to other portions of the anode assembly, focal spot position changes can also be derived from measurements of other portions of the anode assembly relative to a reference point.

Thus, by selecting and implementing an appropriate group of pickups in connection with one or more position sensors 802A, data can be gathered concerning the positioning of various components, or portions, of the x-ray device, and the relative position and/or movement of the focal spot along the Z axis can either be directly determined, or derived, therefrom.

While more particular details are provided below in connection with the discussion of FIG. 4C, the operation of the system illustrated in FIG. 4B generally involves the gathering of various types of x-ray device component and/or focal spot positioning information which is then transmitted to the control module 808A. The control module 808A, using suitable logic, lookup tables or other appropriate systems, software or devices, then generates a corresponding control signal or command which is transmitted to the temperature control system 810A.

The control signal transmitted to the temperature control system 810A causes the temperature control system 810A to implement one or more thermal effects with respect to the x-ray device 804A. Exemplary thermal effects include heating, and cooling, of the x-ray device 804A and/or portions thereof.

Implementation of such thermal effects involves, for example, the adjustment of one or more heat transfer parameters concerning the x-ray device 804A such as, but not limited to, modulation of the efficiency of the temperature control system 810A, so as to affect the temperature of the x-ray device 804A, or to change a coolant mass flow rate and/or coolant bypass flow rate associated with the temperature control system 810A so as to implement a desired thermal effect with respect to the x-ray device 804A. In general, control of the temperature control system 810A in this way and, thus, the resulting temperature of the x-ray device or portions thereof, permits the closed loop control system 800A to use information gathered by the position sensor 802A as an input to processes for directly or indirectly controlling Z axis focal spot position by adjustments to the temperature of the x-ray device 804A.

Figure 4C:
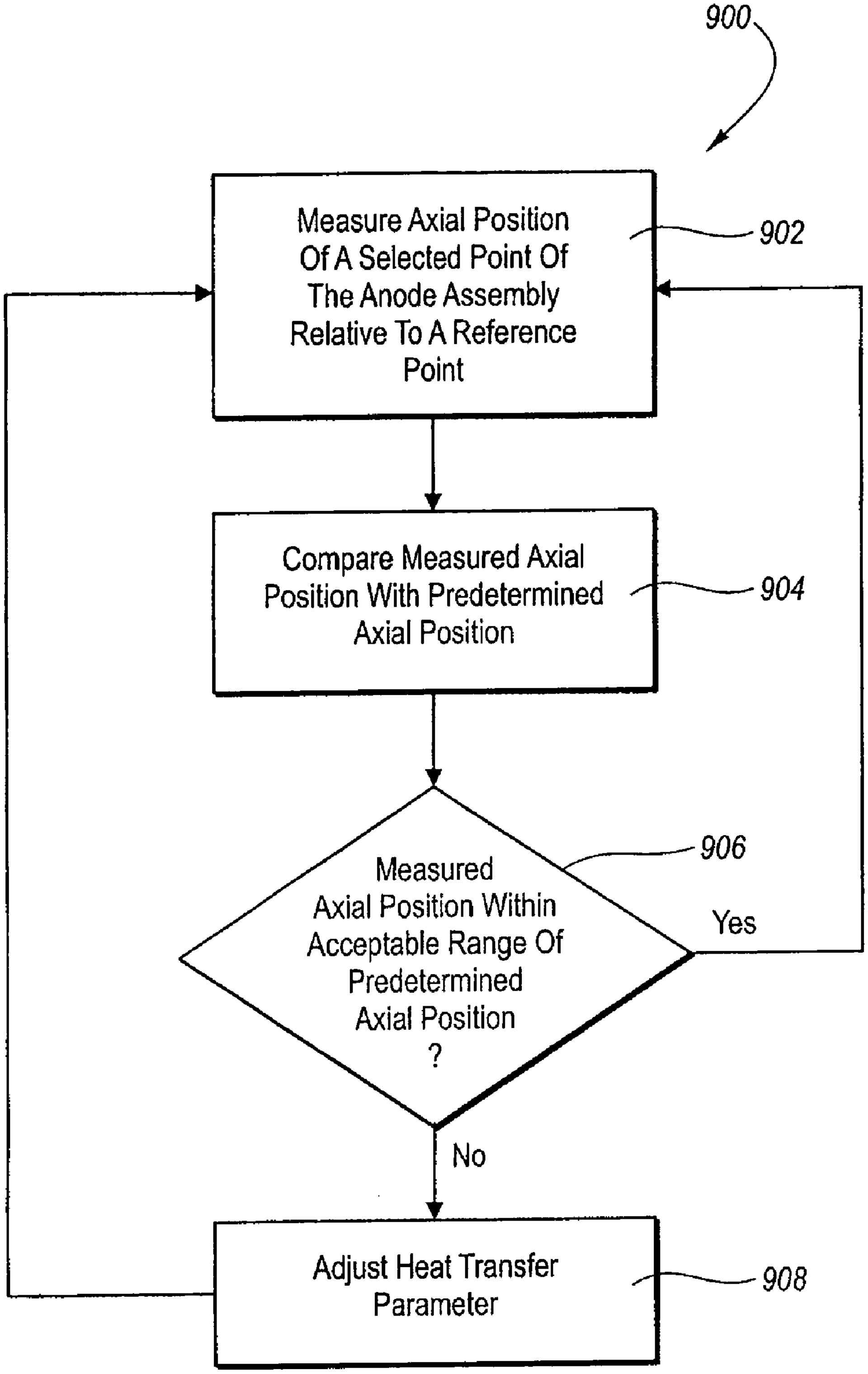
FIG. 4C is a flow diagram illustrating an exemplary method for Z axis focal spot location control such as may be implemented in connection with the system illustrated in FIG. 4B.

Directing attention finally to FIG. 4C, information is provided concerning an exemplary process 900 for using x-ray device component position data as an input to a system for thermally based control of focal spot Z axis location. At stage 902, the Z axis position of a selected point of the anode assembly relative to a defined reference point, typically of the x-ray device, is measured. Exemplarily, the selected point of the anode assembly is the point on the target track of the anode assembly where the focal spot is located.

At stage 904, the measured axial position of the selected point of the anode assembly relative to the reference point is compared with a predetermined axial position of the selected point of the anode assembly relative to the reference point. Thus, stage 904 involves the determination of the extent of the deviation, if any, of the actual state or condition with respect to a desired state or condition.

At decision point 906, a determination is made as to whether or not the measured axial position of the selected point of the anode assembly relative to the reference point is within an acceptable range or deviation from the desired axial position. If the measured axial position is within the acceptable range, the process returns to stage 902. If, on the other hand, the measured axial position is not within the acceptable range, the process advances to stage 908 where one or more heat transfer parameters associated with the x-ray device are adjusted accordingly.

In at least some instances, such adjustment of a heat transfer parameter at stage 908 involves the accessing of a lookup table that correlates various heat transfer parameter values with particular deviations from the acceptable range of the axial position. In any case, the process 900 then returns to stage 902 where the axial position is again measured. The process 900 can be repeated periodically or substantially continuously, as conditions or operating parameters may dictate. Further, as is the case with other methods and processes disclosed herein, damping factors, hysteresis considerations and other features may be incorporated in the method 900 so that, for example, changes to the temperature of the x-ray device in response to changing axial positions are implemented gradually rather than abruptly. Of course, operating conditions and the specific configuration of a particular x-ray device and/or related components may implicate the use of various other features as well.

Finally, at least some embodiments of control systems, such as the control system 800A, are configured to collect data concerning, for example, axial positions of various x-ray device components as such positions relate to x-ray device parameters such as temperature and input power. The collected data is then downloaded to an appropriate computing system so that trends in relationships between, for example, axial positions of components and x-ray device temperatures can be identified. In other cases, such analyses may be performed by the x-ray device. By knowing, for example, that changes have occurred over time with respect to the relationship between x-ray device temperature and focal spot location, analyses can be performed concerning matters such as the life and condition of the x-ray device, and the effects of aging and wear on focal spot positioning.

Moreover, such trend data can be employed in the monitoring and control of the ongoing operation of the x-ray device. For example, such trend data may be employed to modify lookup tables so that the lookup tables reflect the changed relationship between parameters such as input power or x-ray device temperature, and focal spot location.

VI. Computing Environments, Hardware and Software

In at least some cases, some or all of the functionality disclosed herein may be implemented in connection with various combinations of computer hardware and software. With respect to computing environments and related components, at least some embodiments of the present invention may be implemented in connection with a special purpose or general purpose computer that is adapted for use in connection with client-server operating environments. Embodiments within the scope of the present invention also include computer-readable media for carrying or having computer-executable instructions or electronic content structures stored thereon, and these terms are defined to extend to any such media or instructions.

By way of example such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above are also to be included within the scope of computer-readable media. Computer-executable instructions comprise, for example, instructions and content which cause a general purpose computer, special purpose computer, special purpose processing device such as a processing device, controller, or control module associated with an x-ray device and/or x-ray device control system, or other computing device, to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. An x-ray device, comprising:

a housing;

an x-ray tube insert disposed within the housing and including a cathode and an anode assembly arranged in a spaced apart configuration relative to each other;

a first housing mount attached to the housing and configured so as to substantially constrain motion of a first part of the housing along X, Y and Z axes; and a second housing mount attached to the housing and configured so that a second part of the housing is substantially free to translate along at least the Z axis.

2. The x-ray device as recited in claim 1, wherein the second housing mount comprises a roller mount.

3. The x-ray device as recited in claim 1, wherein at least one of the first and second housing mounts are configured to attach at least indirectly to a gantry.

4. The x-ray device as recited in claim 1, wherein the second housing mount is located proximate a point at which the anode assembly is attached to the housing.

5. The x-ray device as recited in claim 1, wherein a focal spot of the x-ray device is positioned at a Z axis location that lies between the first and second housing mounts.

6. The x-ray device as recited in claim 1, wherein the second housing mount substantially constrains motion of the second part of the housing along the X and Y axes.

7. An x-ray device, comprising:

a housing;

an anode assembly positioned within the housing; and a plurality of mounts, the housing being supported by the mounts, and the mounts being configured and arranged such that thermally induced expansion of the housing in a first direction substantially offsets thermally induced expansion of the anode assembly in a second direction opposite the first direction so as to maintain a part of the anode assembly in a substantially constant position relative to a detector external to the x-ray device over a range of thermal conditions.

8. The x-ray device as recited in claim 7, wherein the part of the anode assembly that is maintained in a constant position corresponds to an x-ray focal spot on the anode assembly.

9. The x-ray device as recited in claim 7, wherein at least one of the mounts is a roller mount.

10. The x-ray device as recited in claim 7, wherein one of the mounts is configured to attach at least indirectly to a gantry.

11. The x-ray device as recited in claim 7, wherein one of the mounts is located proximate a point at which the anode assembly is attached to the housing.

12. The x-ray device as recited in claim 7, wherein one of the mounts substantially constrains motion of a portion of the housing along X and Y axes but permits translational movement of the housing along a Z axis.

13. An x-ray device, comprising:

an x-ray tube housing mounted to a structure by way of a plurality of mount elements; and an x-ray tube disposed within the x-ray tube housing, wherein a first one of the mount elements affixes the x-ray tube housing to the structure at a mounting point on the housing such that motion of the housing relative to the structure at the mounting point is substantially prevented, and wherein the x-ray tube housing is movable relative to a second one of the mount elements when the x-ray tube housing undergoes a size change relative to the structure.

14. The x-ray device as recited in claim 13, wherein the structure to which the housing is mounted is attached to a gantry.

15. The x-ray device as recited in claim 13, wherein the structure to which the housing is mounted includes a gantry.

16. The x-ray device as recited in claim 13, wherein the second mount element is affixed to the structure to which the housing is mounted but is not affixed to the x-ray tube housing.

17. The x-ray device as recited in claim 13, wherein the second mount element is located proximate a point at which the anode assembly is attached to the housing.

* * * * *

UNITED STATES PATENT AND TRADEMARK OFFICE

CERTIFICATE OF CORRECTION

PATENT NO. : 7,507,026 B2

APPLICATION NO. : 11/876656

DATED : March 24, 2009

INVENTOR(S) : Andrews et al.

It is certified that error appears in the above-identified patent and that said Letters Patent is hereby corrected as shown below:

Column 1

Line 4, delete the second instance of "TO"

Signed and Sealed this

Thirteenth Day of July, 2010

David J. Kappos

*Director of the United States Patent and Trademark Office*